(12) United States Patent
Bolotov et al.

(10) Patent No.: US 10,846,437 B2
(45) Date of Patent: Nov. 24, 2020

(54) COMPRESSED INTEGRITY CHECK COUNTERS IN MEMORY

(71) Applicant: Intel Corporation, Santa Clara, CA (US)

(72) Inventors: Anatoli Bolotov, San Jose, CA (US); Mikhail Grinchuk, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 16/022,402

(22) Filed: Jun. 28, 2018

(65) Prior Publication Data

US 2019/0042795 A1 Feb. 7, 2019

(51) Int. Cl.
| | | |
|---|---|---|
| *G06F 21/64* | (2013.01) | |
| *G06F 11/10* | (2006.01) | |
| *G06F 12/0815* | (2016.01) | |
| *H04L 9/08* | (2006.01) | |
| *G06F 21/79* | (2013.01) | |
| *G11C 29/52* | (2006.01) | |
| *G11C 29/04* | (2006.01) | |

(52) U.S. Cl.
CPC .......... *G06F 21/64* (2013.01); *G06F 11/1048* (2013.01); *G06F 11/1068* (2013.01); *G06F 12/0815* (2013.01); *G06F 21/79* (2013.01); *H04L 9/0891* (2013.01); *G06F 2212/1032* (2013.01); *G06F 2212/402* (2013.01); *G11C 29/52* (2013.01); *G11C 2029/0411* (2013.01)

(58) Field of Classification Search
CPC .. G06F 21/64; G06F 11/1048; G06F 11/1068; G06F 12/0815; G06F 21/79; H04L 9/0891
See application file for complete search history.

(56) References Cited

U.S. PATENT DOCUMENTS

| | | | |
|---|---|---|---|
| 7,735,072 B1 * | 6/2010 | Altman | G06F 11/348 717/158 |
| 8,095,824 B2 * | 1/2012 | Gray | G06F 12/0815 714/16 |

(Continued)

OTHER PUBLICATIONS

Taassori et al., (VAULT: Reducing Paging Overheads in SGX with Efficient Integrity Verification Structures, ASPLOS'18, Mar. 24-28, 2018, pp. 665-678) (Year: 2018).*

(Continued)

*Primary Examiner* — Oleg Korsak
(74) *Attorney, Agent, or Firm* — Schwegman Lundberg & Woessner, P.A.

(57) ABSTRACT

System and techniques for compressed integrity check counters in memory are described herein. A set of counters may be maintained for data areas in memory. A respective counter is the set of counters is used to provide a variance to encryption operations on a corresponding data area. The respective counter is each time data is modified in the corresponding data area. The respective counter implemented by a generalized multi-dimensional counter (GMDC). In response to a trigger, a counter reset is performed on the set of counters. The counter reset may include refreshing the corresponding data area using a new key and resetting the respective counter to a default value in response to the refresh.

24 Claims, 7 Drawing Sheets

(56) References Cited

U.S. PATENT DOCUMENTS

| | | | |
|---|---|---|---|
| 8,706,973 B2* | 4/2014 | Lee | G06F 9/528 |
| | | | 711/144 |
| 10,037,282 B2* | 7/2018 | Waldspurger | G06F 12/0891 |
| 2014/0208109 A1* | 7/2014 | Narendra Trivedi | |
| | | | G06F 12/1408 |
| | | | 713/170 |

OTHER PUBLICATIONS

Liu et al., (Dynamic Encryption Key Design and Its Security Evaluation for Memory Data Protection in Embedded Systems, IEEE, 2014, 4 pages) (Year: 2014).*

Swami et al., (COVERT: Counter OVErflow ReducTion for Efficient Encryption of Non-Volatile Memories, IEEE, 2017, pp. 906-909) (Year: 2017).*

Yan et al., (Improving Cost, Performance, and Security of Memory Encryption and Authentication, ISCA-33, 2006, 12 pages) (Year: 2006).*

* cited by examiner

US 10,846,437 B2

COMPRESSED INTEGRITY CHECK COUNTERS IN MEMORY

TECHNICAL FIELD

Embodiments described herein generally relate to memory devices and more specifically to compressed integrity check counters in memory.

BACKGROUND

Computer systems have become a part of everyday life. As computer systems are found in more devices in a greater number of critical roles, data integrity, including security, has become a greater issue for systems designers. Security threats generally seek to gain control of the system or information held thereon. While tools such as encrypting network traffic have been effective at counteracting security threats originating from outside of a given system, some threats attack the heart of the computer system by attempting to glean information directly from the computer system's processors or operating memory (e.g., memory used to hold a current system state, such as random-access memory (RAM) or the like).

The number of hardware attacks (both invasive and non-invasive) are growing, hoping to gain access to the large amount of sensitive data on computer systems that may be held outside of a processor's trusted zone (e.g., in dynamic RAM (DRAM)). To combat these threats, secure architectures and cryptographic methods are implemented to protect memory operations to prevent an intruder from maliciously tampering with, or gaining access to, the data stored in the memory. The security architectures generally use three cryptographic primitives: confidentiality; integrity; and freshness.

Confidentiality ensures the privacy of data by encrypting data before it is written to the memory and decrypting the data from the memory. Integrity ensures that the saved data has not been modified (e.g., corrupted or adulterated). Freshness ensures that data is versioned such that old data cannot be reused (e.g., it prevent replay attacks in which valid, but old data is used by an attacker).

The data storage is often viewed as an array of storage blocks (e.g., cache lines), with basic operations that include reading and writing an entire block at a time. ECC memory typically includes additional space to hold error correction codes (ECCs), resulting in larger storage blocks for the basic operations. For example, a storage block may contain 512 bits for the data and 64 or 128 bits for the ECC data. Generally, the storage is designed such that the additional ECC area is retrieved along with the data (e.g., via a parallel integrated circuit (IC) tied to the storage block address, or via larger storage blocks, etc.). The ECC codes generally provide error detection, and possibly error recovery. In some cases, the controller performs the error detection or correction based on the ECC codes as part of satisfying a read request.

To provide data integrity and freshness for data in the memory, user data is often accompanied by an integrity check value (ICV). ICVs may vary in size (e.g., 64 bits, 112 bits, etc.), generally providing greater protection as they grow. Several ICVs (e.g., eight given a 64-bit ICV size and 512-bit cache line) may be packed together and stored in dedicated cache lines, where the address of the dedicated cache line and placement within the cache line are determined by the address of the user data cache line. In an example, an ICV may occupy the extra bits of a cache line for ECC information (e.g., an ECC area of the memory) in ECC memories.

For a data word W, value of its ICV may depend on several parameters in addition to W, such as an address A, a key K, and a nonce N. To provide freshness, at least one of these parameters has a new, and non-repeating, value each time data is written to A. A monotonic counter (e.g., counter) is often used to provide this changing value. Because counters are stored, ICVs for the counters themselves may be maintained, to avoid an attack manipulating the counters. This structure may be referred to as an integrity tree (e.g., a Merkle tree). In an example, the root of the integrity tree is not stored in the memory array itself, but rather on the memory controller (e.g., in on-chip static RAM (SRAM)).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
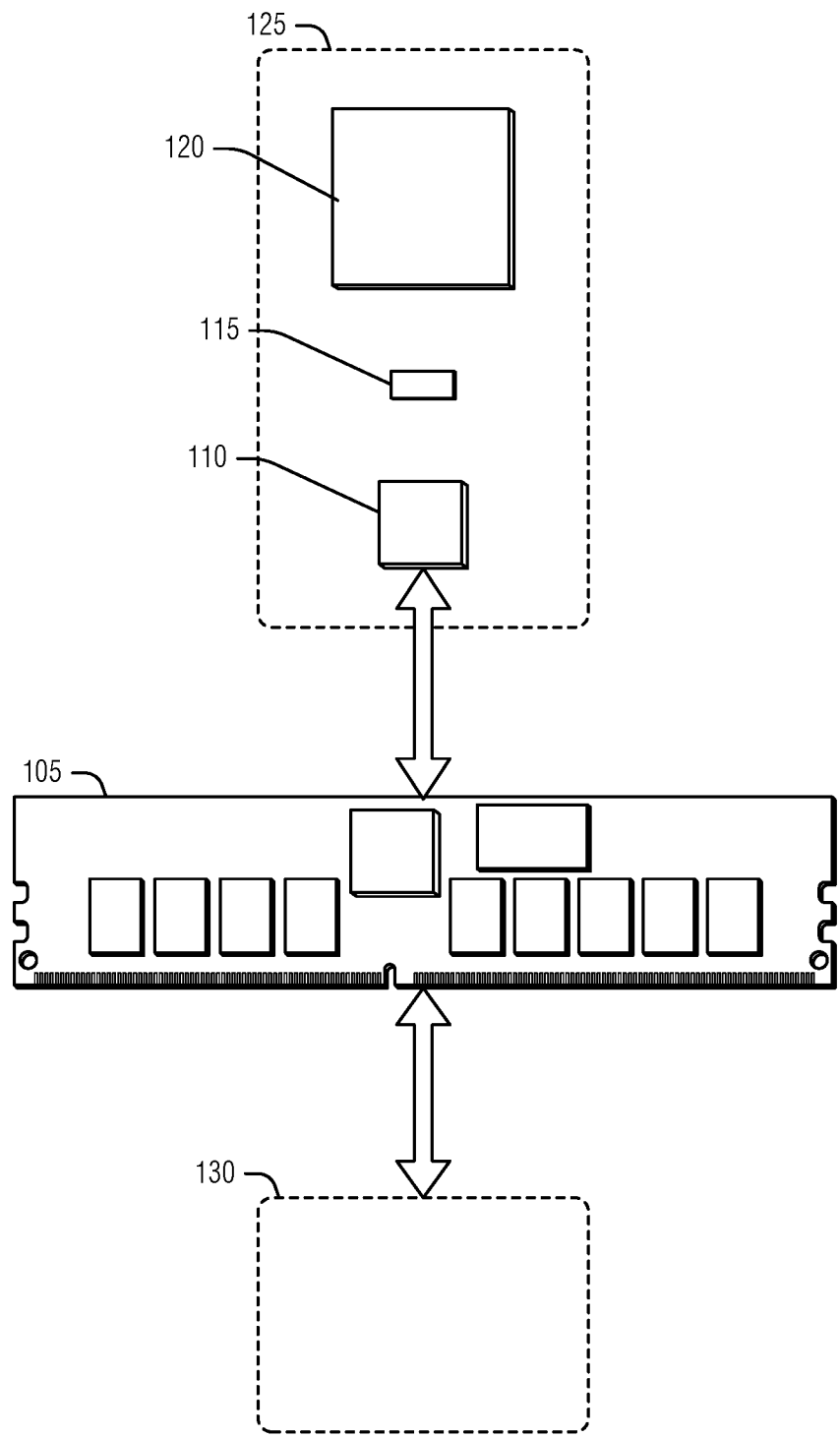
FIG. 1 is a block diagram of an example of an environment including a system for compressed integrity check counters in memory, according to an embodiment.

The counters used for ICVs (as well as other encryption operations) have generally been large to prevent overflows (e.g., when the counter reaches its maximum value). Due to the generally fixed size of cache lines (e.g., imposed by the memory hardware), a given cache line is therefore limited in how many counters it stores. Thus, more cache lines are used for counters, which may lead to a deep integrity tree. Generally, the greater the integrity tree depth, the more overhead there is in terms of operations (e.g., reads and writes) as well as storage. Although counters with fewer bits may be used to alleviate this problem, it generally leads to some security degradation (e.g., overflows are ignored, and counter values may repeat).

To address these problems of counter size and integrity tree depth, a technique of compressed integrity check counters may be used. Here, small counters are used to provide short term freshness, while keys used to encrypt data are continually changed. In such an implementation, the combination of the counter value and the key provide the freshness that protects the data, and the counters are able to be reset as data is refreshed (e.g., re-encrypted or re-tagged with a new ICV) with the new key without sacrificing the monotonic property. Thus, the small counters are still monotonic with respect to a given key, and do not overflow.

The technique may be rephrased as, for each memory address (e.g., location), version numbers are monotonously maintained and incremented with each write operation. The version numbers (e.g., implemented by the counters) are used as "seals" and not reused to provide short term data freshness and anti-replay protection. In the background, an infinite loop repeatedly scans the memory and, for each visited memory location, the version number is reset (e.g., refreshed) to prevent overflows and the data is refreshed (e.g., re-encrypted or re-tagged) with new keys (e.g., and nonces) to provide long term anti-replay protection. An integrity tree with compressed representations of several version numbers—e.g., embodied in a Generalized Multi-Dimensional Counter (GMDC)—is used to reduce memory overhead and integrity tree depth. In an example, the root of the integrity tree and, in an example some other values (e.g., most recently used or most frequently updated counters or data) are stored in the memory controller (e.g., not on the memory array).

Implementing the compressed integrity check counters as described herein provides several benefits. For example, the reduced integrity tree depth and background processing of data refreshing result in robust security while minimizing the average impact of data and latency (e.g., throughput) of the memory. That is, in contrast to other techniques, a cryptographically strong integrity and replay protection solution (e.g., for off-chip memory and remote storage systems) is enabled that has with high throughput, low latency, and low peak values of read and write overhead for a given memory access. Additional examples and details are described below.

FIG. 1 is a block diagram of an example of an environment including a system 125 for compressed integrity check counters in memory, according to an embodiment. The system 125 represents a secure, or trusted, zone of a computer system. The system 125 includes a processor 120, cache 115 (e.g., used to speed processor access to frequently used data), and a memory controller 110. The memory controller 110 is connected to a memory 105.

In an example, the memory 105 is ECC memory, which is designed to support error detection and correction by including dedicated hardware (e.g., storage, bandwidth, etc.) to enable the retrieval of ECC data along with user data. This may be accomplished via a dedicated IC on the memory 105 to store ECC data, via physical cache lines that are greater than a cache line addressable by the processor 120, or via several other techniques (e.g., memory array striping, etc.). As used herein, a data area is addressable by host devices, and an ECC area is a portion of the memory 105 correlated to a data area (e.g., via the dedicated hardware). In an example, the ECC area is retrieved simultaneously (e.g., without additional requests to the memory 105) with its corresponding data area. In an example, the ECC area is not directly addressable by the host.

The environment contemplates malicious devices 130 that may access the memory 105 via software or hardware. To prevent the unauthorized access to, or tampering with, data in the memory 105 by the malicious devices 130, the memory controller 110 is configured to implement memory security. As part of this memory security, the memory controller 110 implements and uses compressed memory integrity check counters, used to provide variance (e.g., freshness, versioning, etc.) to encryption operations including creation of ICVs. To this end, the memory controller 110 is arranged to maintain a set of counters for data areas in the memory 105. A given counter in the set of counters is used to provide a variance to encryption operations on a corresponding data area. Generally, the counter is related to the data area via the data area's address. The counter is incremented each time data is modified in the data area. The counter incrementation usually occurs before it is used to compute a new ICV for the data area as the data area is written. The ICV may then be used (e.g., by the memory controller 110), during a subsequent read to verify that the content of the data area has not been manipulated. In an example, the counter is stored in a cache line of the memory along with the ICV. In ECC memories, the ECC area of a cache line may be used to store the ICV. This has several advantages, including preventing additional reads to perform the integrity check when the data is read. This ECC area may have additional bits that are free to store the counter upon. In an example, the data area is a cache line of the memory. Here, cache line refers to an addressable portion of the physical cache line. Thus, in ECC memory, the addressable cache line may be 512 bits, while an additional 128 bits are reserved for the memory controller 110 and referred to here as the ECC area (although it may be used for things other than ECC information). In non-ECC memories, the addressable cache line may be the same as the physical cache line.

The memory controller 110 is arranged to perform a counter reset on the set of counters in response to a trigger. As noted above, this resetting may occur in an infinite loop (e.g., an operation that continuously repeats while the memory controller 110 is active). In this case, the trigger is a next available time period for the memory controller 110 to perform an operation. Available time periods may be interspersed with higher-priority operations, such as servicing a read or write request by the host (e.g., processor 120). In an example, the counter reset is performed during maintenance periods, such as garbage collection, defragmentation, or other operations in which the memory controller 110 engages to maintain the memory 105. In an example, the trigger is observation of a critical condition, such as a counter approaching its overflow value.

The counter reset includes visitation of data areas with corresponding counters. This includes both user data areas (e.g., containing data originating from an entity other than the memory controller 110, such as the processor 120, an application, other device, etc.) and data areas containing counters (or other memory controller 110 data) protected by an ICV or another encryption operation using a counter. As each data area is visited, the memory controller 110 is arranged to refresh the data area with a new key. The refreshing may include re-encrypting the data area or retagging the data area via a new ICV. The new key is different than previous keys used to refresh the data area. In an example, the new key is used to encrypt all data areas. With the refreshing of the data area, the counter may be reset because the combination of the key and the counter provides the freshness (e.g., the counter tracks versions of the data area encrypted with a given key). Thus, the memory controller 110 is arranged to reset the counter to a default value in response to encrypting the data area using the new key. In an example, the default value is zero.

The continual refreshing of the data areas and resetting of the counters enables small counters to provide cryptographically robust protection of the data areas. Storing at least one counter in the memory controller 110, and using that counter to protect the data area counters, provides security via the trusted environment of the system 125. However, depending on the number of writes expected for data areas, and the number of data areas, all the counters may not fit into a single cache line of the memory 105. In these examples, an integrity tree may be implemented by the memory controller 110. To this end, in an example, the set of counters are arranged as a hierarchy of counters. Here, the highest level of the hierarchy (e.g., the root) is stored on the memory controller 110, while the lowest level includes counters that correspond to user data areas. The interim levels include counters used to protect lower-level counters. Thus, a counter of order 1 is in the lowest level, while a counter of order 2 protects counters of order 1, and so on.

In examples where all encryption operations by the memory controller 110 use the same key (e.g., the new key will be used to refresh all the data areas), all the data areas are changed at roughly the same time (e.g., as part of one effort even though it may occur over a period of time). This effort may be organized in a variety of ways. In an example, the counter reset performed by the memory controller 110 is performed in a progressive wave through the hierarchy of counters. In an example, the wave starts at the highest level of the hierarchy of counters and moves towards the lower levels. In an example, the wave may have a structured movement at each level (e.g., progressing from a lowest address to a highest address for data areas). In an example, the wave progression is based on a counter index (e.g., counter 13 to counter 1).

The set of counters may be organized in different data structures (e.g., trees, collections, etc.), counter+overflow structures, etc. In an example, the set of counters are implemented as a generalized multi-dimensional counter (GMDC). In an example, the GMDC has a structure divided by cache lines of the memory 105. For a given cache line, the GMDC maintains local counters that correspond to user data areas or to cache lines holding other counters. In an example, for a given cache line, the GMDC also includes a hierarchy of overflow counters. In an example, for a given cache line, the GMDC also includes a global counter. In an example, a local counter is combined with the global counter to produce variances for encryption operations.

Figure 2:
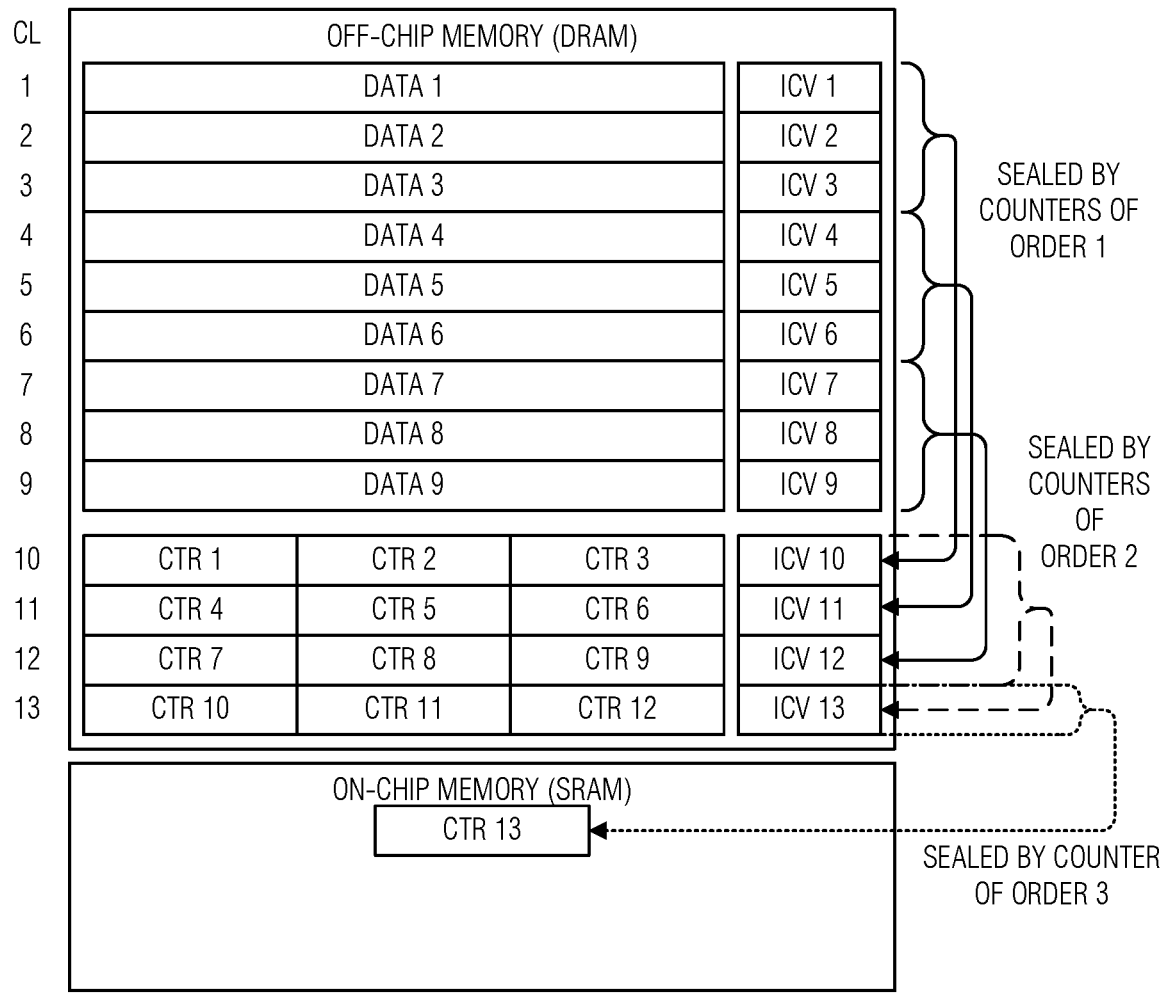
FIG. 2 illustrates an example relationship between cache lines and counters in memory, according to an embodiment.

FIG. 2 illustrates an example relationship between cache lines and counters in memory, according to an embodiment. The illustrated example is of ECC memory where user data is stored in a data area of cache lines 1-9 and corresponding ICVs are stored in the ECC area of these cache lines. The data areas of cache lines 10-12 hold counters used for cache lines 1-9 (order 1 counters), and each has its own corresponding ICV in the respective ECC areas, while the counters in cache line 13 hold counters used for cache lines 10-12 (order 2 counters). The counter for cache line 13 (order 3 counter) is stored in the memory controller.

To maintain and use the integrity tree, requests to read or write data at cache line 4 may proceed as follows: Reading:
1) retrieve cache line 4, cache line 11, and cache line 13; decrypt their content;
2) perform integrity checks on each retrieved cache line (e.g., verify that ICV4=h(data4, ctr4, . . . ), ICV11=h({ctr4, ctr5, ctr6}, ctr11, . . . ), and ICV13=h({ctr10, ctr11, ctr12}, ctr13, . . . ))—where h( ) is a hash function, and where " . . . " represents additional arguments in the sequence (e.g., ctr11-ctrN)
3) if all checks passed, return decrypted data 4, otherwise report an integrity violation.

Writing:
1) retrieve cache line 4, cache line 11, and cache line 13; decrypt their content;
2) perform integrity checks on each retrieved cache line (e.g., verify that ICV4=h(data4, ctr4, . . . ), ICV11=h({ctr4, ctr5, ctr6}, ctr11, . . . ), and ICV13=h({ctr10, ctr11, ctr12}, ctr13, . . . ))—operations 1 and 2 ensure no malicious modifications occurred;
3) save local copy of these three cache lines once they pass the integrity check in on-chip buffers (e.g., registers) of the memory controller;
4) replace local copy of data 4 by its new value;
5) update (e.g., increment) ctr4, ctr11 and ctr13 in these local copies;
6) encrypt cache line 4, cache line 11, and cache line 13 using new values of data and counters;
7) compute new values for ICV 4, ICV 11, and ICV 13;
8) write back cache line 4, cache line 11, and cache line 13.

Figure 3:
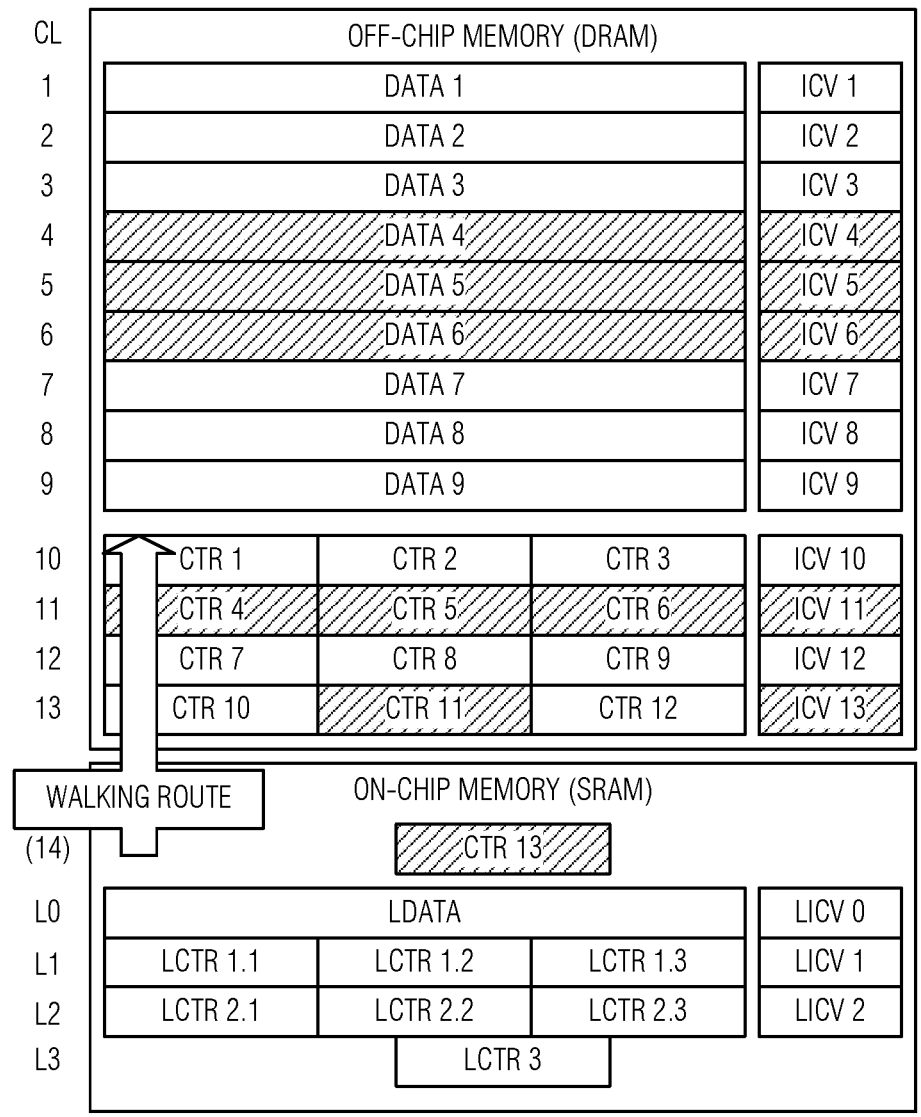
FIG. 3 illustrates an example of modifying memory in an operation to reset counters, according to an embodiment.

FIG. 3 illustrates an example of modifying memory in an operation to reset counters, according to an embodiment. The structure illustrated is similar to that illustrated in FIG. 2 except that the memory controller on-chip cache includes a place (e.g., a local buffer which may be implemented in a dedicated register or as part of on-chip RAM) for storing a cache line. In the depicted example, this on-chip cache includes four lines: line L0 corresponds to level 0 (e.g., for one of cache lines 1-9; line L1 corresponds to level 1 (e.g., for one of cache lines 10-12); line L2 corresponds to level 2 (e.g., cache line 13), and simpler line L3 corresponds to level 3 (e.g., the root counter).

The refreshing procedure involves the following. First, note that for each address i, i=1 . . . 13, the data portion of cache line CL [i]—the data word W[i] (e.g., depicted as data[i], i=1 . . . 9, or as a concatenation of three counters for i=10 . . . 13)—value of ICV[i], and the version number V[i]—represented by counter ctr[i]—are related by an equation of type ICV[i]=h(W[i], i, K, V[i]) where K is the current key—to simplify the description, a nonce is omitted, although it can be considered as part of the key. The refreshing procedure involves replacing an old (e.g., previous) key $K_{old}$ with a new key $K_{new}$, computing new ICVs, and resetting the version numbers (e.g., counters). Refreshing may also involve re-encrypting the data if it was stored in an encrypted form. For example, if $W_{encrypted}[i]$=Encrypt($W_{plain}[i]$, K, V[i]) then changing $K_{old} \rightarrow K_{new}$ and $V_{old} \rightarrow V_{new}$ is reflected by $W_{encrypted_{old}}[i] \rightarrow W_{encrypted_{new}}[i]$ such that $W_{encrypted_{new}}[i]$=Encrypt(Decrypt($W_{encrypted_{old}}[i]$, i, $K_{old}$, $V_{old}[i]$), i, $K_{new}$, $V_{new}[i]$).

When refreshing the entire memory is done, the new key becomes old and the process is repeated with a next new key. In an example, changing $K_{old}$ to $K_{new}$ is split into local steps and organized as a wave (e.g., walking route) passing throughout memory. In this example, everything before the wave is protected by $K_{old}$ and everything after the wave is protected by $K_{new}$. In an example the wave passes along counters in backward order. As illustrated, this is from ctr13 down to ctr 1. The shaded elements of FIG. 3 are those the elements updated when the wave hits counters ctr4, ctr5, ctr6) stored in cache line 11.

Using cache lines 4-6 as an example, the refreshing procedure may include the following operations:
1) copy into on-chip buffer the branch of the integrity tree between cache lines 11 and the root—here, cache line 11 to L1, cache line 13 to L2, and the root to L3;
2) decrypt and validate (e.g., perform integrity checks) the copied values, starting from the root;
3) read cache line 4 (e.g., copy cache line 4 to L0), decrypt it (with $K_{old}$) and validate it;
4) reset Lctr[1.1] (e.g., the local copy of ctr[4]);
5) encrypt L0 (using $K_{new}$) and compute LICV[0] (e.g., the local copy of ICV[4]);

6) repeat operations 3-5 for cache lines 5 and 6 and the corresponding local counters (e.g., Lctr) for these cache lines; and
7) update the integrity tree branch (e.g., incrementing counters in the same manner used for a standard write) by:
   7.1) incrementing Lctr[2.2] (e.g., the local copy of ctr11);
   7.2) encrypting L1 and computing LICV[1] (e.g., the local copy of ICV[11]);
   7.3) copying L1 to cache line 11;
   7.4) incrementing Lctr[3] (e.g., the local copy of ctr13);
   7.5) encrypting L2 and computing LICV[2] (e.g., the local copy of ICV[13]);
   7.6) copying L2 to cache line 13; and
   7.8) copying L3 to the root (e.g., copying Lctr[3] to ctr13).

When the wave passes counters of higher orders (e.g., in cache line 13), groups of lower order counters are being refreshed (e.g., ctr10, ctr11, ctr12) rather than user data. Here, the wave starts from the root (e.g., logical cache line 14, or ctr13), to refresh the last portion of memory (e.g., cache line 13). The complexity of this procedure is comparable with to that of one regular host write request—in both cases a read, update, and write back of one branch of the integrity tree is involved. In an example, the number of extra reads or writes may be reduced if some values are kept in the on-chip cache. In the procedure outline above, it is assumed that this cache is filled and fully emptied each time a new cache line is processed. However, some values, such as cache line 13, may be maintained in the memory controller cache using a variety of techniques (e.g., most frequently used, etc.).

Figure 4:
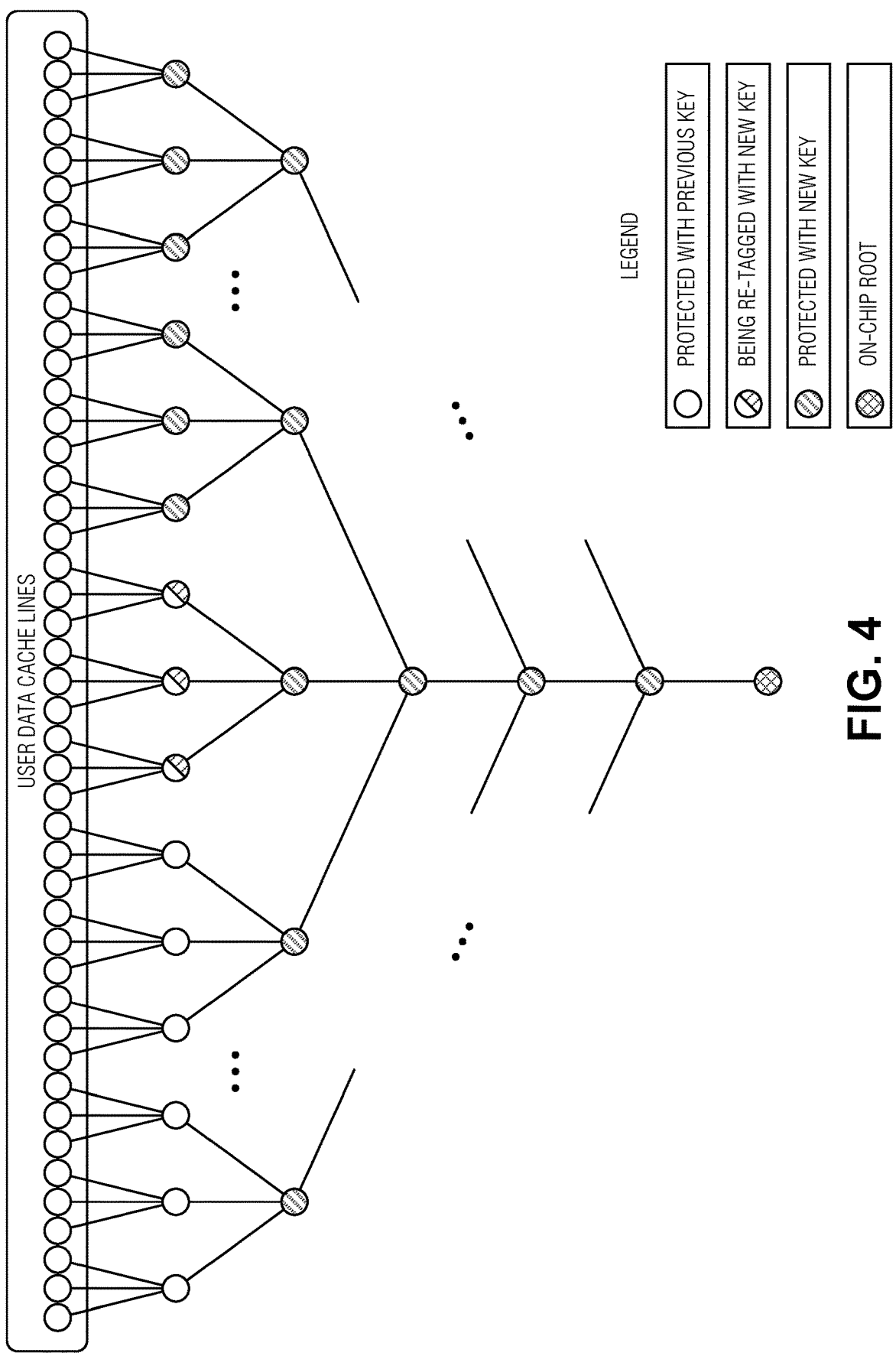
FIG. 4 illustrates an example of a counter hierarchy being reset, according to an embodiment.

FIG. 4 illustrates an example of a counter hierarchy being reset, according to an embodiment. Specifically, FIG. 4 is a graphical representation of an integrity tree during the refreshing procedure. Each node that is not the root node represents one cache line. The nodes in the top row contain user data and the remaining nodes hold counters. Refreshing may be viewed as a wave which traverses all levels of the tree except for the level containing user data, starting from the on-chip root. At the end of a single pass of the wave all tags (e.g., ICVs) are recomputed with the new key.

To process a node at the front of the wave, the entire branch from that node up to the root is validated, counters in the node are reset, and all of the dependent nodes of the previous (e.g., upper) level are updated. The updating includes re-computing their ICVs (e.g., Galois/Counter Mode (GCM)-Advanced Encryption Standard (AES) or the like) and may include re-encryption of their data.

Figure 5:
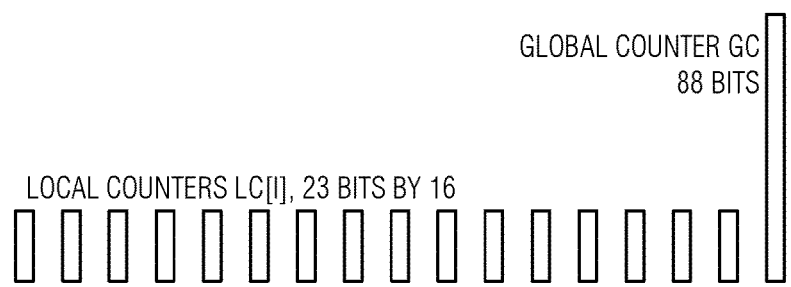
FIGS. 5-7 illustrate examples of counter configurations, according to embodiments.
Figure 6:
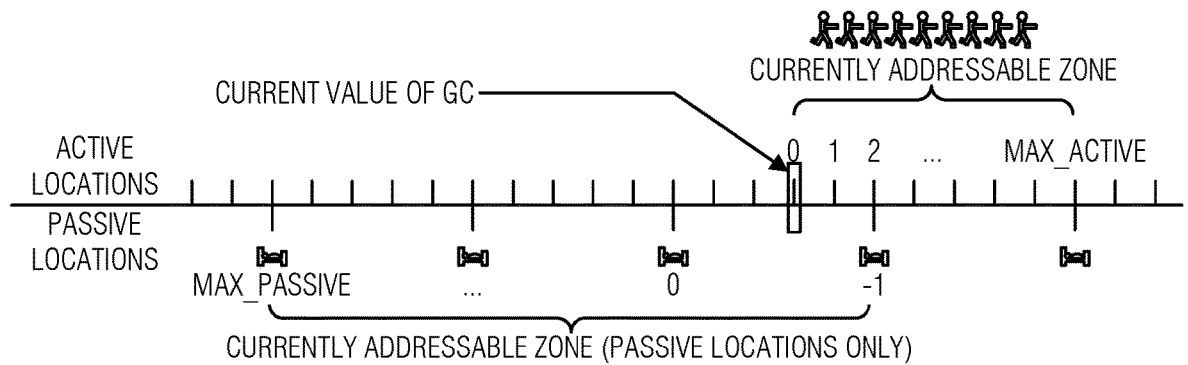
Figure 7:
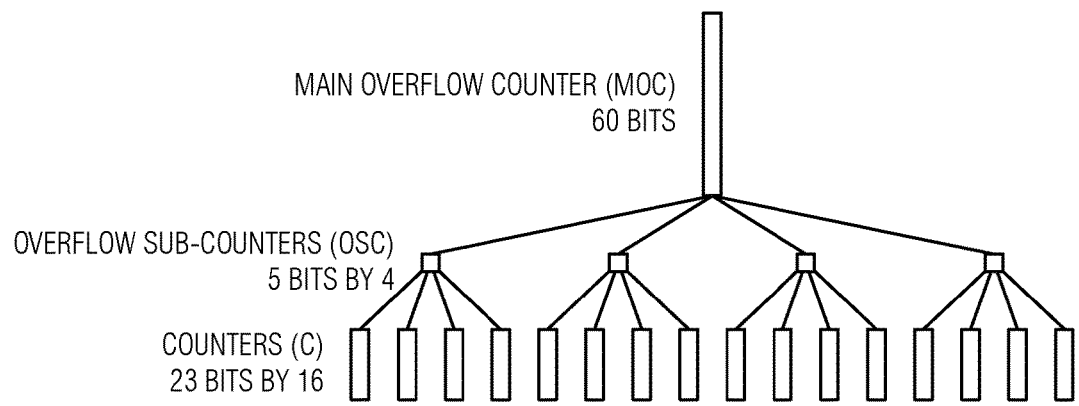

FIGS. 5-7 illustrate examples of counter configurations, according to embodiments. First, an example of a counter data structure is for compressed version numbers is GMDC. GMDC is a data structure generalizing a group of version counters packed in one cache line. The group of counters may include a set of counters with an overflow counter (e.g., as illustrated in FIG. 5), or other organizations. However, the design parameters and functionality (e.g., interface) include:
   Parameters:
   L: bit size (e.g., the size of a cache line less the size of an ICV)
   N: number of version numbers represented by the GMDC
   Interface:
   RESET: operation to reset a counter to an initial state
   GET(i): operation to retrieve the value of the ith counter
   GET_ALL: operation to retrieve the values of all the counters UPDATE(i): operation to update a counter i The UPDATE(i) operation may involve: i such that $0 \leq i < N$, changes are made to reflect writing to the ith cache line (e.g., incrementing of the ith version number, or incrementing other version numbers—if this happens, corresponding cache lines will be refreshed.

FIG. 5 illustrates an example of the GMDC. Here, the GMDC includes several local counters (LC) and one global counter (GC). During a GET operation, version numbers are represented by adding one of the local counters to the global counter. The RESET operation clears all counters. The UPDATE(i) operation includes:

incrementing $LC[i]$ by 1;

computing $m = \min_j LC[j]$ and $M = \max_j LC[j]$;

if m>0, then subtract m from each LC[j] and add m to GC—this does not change any of the version numbers);
if M>m+T—where the threshold T is the maximum capacity of the LC counters less the number of LC counters, then select an index k, such as LC[k]=0, and set the selected index to T (e.g., set LC[k]=T).

Therefore, after performing UPDATE(i), only one (the jth) or two (the ith and the kth) version numbers are changed. Because these changes involve refreshing of underlying cache line, here there is either no overhead (e.g., if only one version number was modified) or the overhead of one cache line update.

FIG. 6 is another example of GMDC in which the structure of the registers is the same as described above with respect to FIG. 5, however the meaning of values stored in the LCs is different and access operations are more complicated. Let LC represent and distinguish active values from $0, 1, \ldots, MAX_{ACTIVE}$ and passive values from $-1, 0, 1, \ldots, MAX_{PASSIVE}$—because an n-bit local counter represents $2^n$ different values, $MAX_{ACTIVE} + MAX_{PASSIVE} \geq 2^n - 3$. Also, let $T_{ACTIVE}$ and $T_{PASSIVE}$ be two positive threshold values such that $T_{ACTIVE} < MAX_{ACTIVE}$ and $T_{PASSIVE} < MAX_{PASSIVE}$—for simplicity, LC may be considered as a pair of an active-passive flag and a numerical value. Given this, GET(i) decodes version numbers by:

if $LC[i]$ holds an active value $AV$, then $GET(i) = GC + AV$;

if $LC[i]$ holds a passive value $PV$, then $GET(i) = \left(\left\lceil \dfrac{GC}{T_{ACTIVE}} \right\rceil - PV\right) \times T_{ACTIVE}$.

Thus, for a given value of GC, GET(i) addresses all numbers from GC to $GC + MAX_{ACTIVE}$ and at least $MAX_{PASSIVE}$ values below GC—e.g., those values that are multiples of $T_{ACTIVE}$ and are nearest to GC.

RESET may involve setting all LC in passive 0 and clearing the GC.

UPDATE(i) is the most involved operation, because, with each user's write request, three operations are performed:
   1) normalization: if not all LCs are passive (e.g., some are active), and if all active values are strictly positive (e.g., GET(j)>GC for all such j), then set GC=minimum of all active GET(j) and update the LCs to compensate this change in order to keep all GET(j) unchanged;

2) core-activity: advance the ith version number (recall that argument i specifies which cache line is being updated), by, for example, making LC[i] active and setting its value in such a way that GET(i) [new]>GET(i)[old]; and 3) maintenance: if necessary, perform system maintenance to prevent LC overflows—this will be infrequent). The system maintenance includes:
   if there are passive values larger than $T_{PASSIVE}$, then choose the LC with the largest value and set it to 0;
   otherwise, if there are both at least one active value larger than $T_{ACTIVE}$ and at least one active value equal to 0, then choose one of these LCs with value 0 and set it to $T_{ACTIVE}$.

The GMDC described here has the property that, after performing UPDATE(i), only one (the jth) or occasionally two (the ith and the kth, where k is the index of the LC set to 0 in system maintenance) version numbers are changed. In scenarios with selective access to memory (e.g., where one group of indices i is actively used in UPDATE(i) and another group is not) are not worst-case scenarios. Further, because the technique is self-adjusting, if from time to time a user changes group distributions, the technique is more adaptable to changes than some other techniques.

FIG. 7 is another example of GMDC. This structure is a lightweight solution to reduce, in most but not in all cases, the amount of overhead caused by counter overflows. Counters are organized into groups. Each group includes a dedicated overflow sub-counter. In the case of overflow, only the counters inside the related group are reset and the group-overflow sub-counter is incremented. Only in the case of an overflow of one of these sub-counters, are all counters and overflow sub-counters across groups reset, and the main overflow counter is incremented. In an example, there may be more than one layer of these sub-counters.

For example, given sample numerical parameters are N=16 and L=448, with the 448 bits distributed between sixteen 23-bit counters C[0] . . . C[15], four 5-bit overflow sub-counters OSC[0] . . . OSC[3], and a 60-bit main overflow counter MOC, then:
RESET includes initializing (e.g., setting to 0) all counters.
GET(i) concatenates {MOC, OSC[j], C[i]}, where j is the index of overflow sub-counter connected with the ith counter. UPDATE(i) includes:
   if C[i] is less than the maximum possible value, then increment C[i] by one; else:

compute $j = \frac{i}{4}$;

if OSC[j] is less than the maximum possible value, then increment OSC[j] by one and reset all counters C connected with OSC[j] (e.g., set C[4×j]= . . . =C[4×j+3]=0);
   else increment MOC by one and reset all other counters (e.g., OSC[0]= . . . =OSC[3]=0, and C[0]= . . . =C[15]=0).

Thus, overflow of C[i] mostly will involve refreshing of three cache lines (e.g., one group), and only in rare cases of overflowing both of C[i] and OSC[j], will all 15 cache lines be refreshed.

Figure 8:
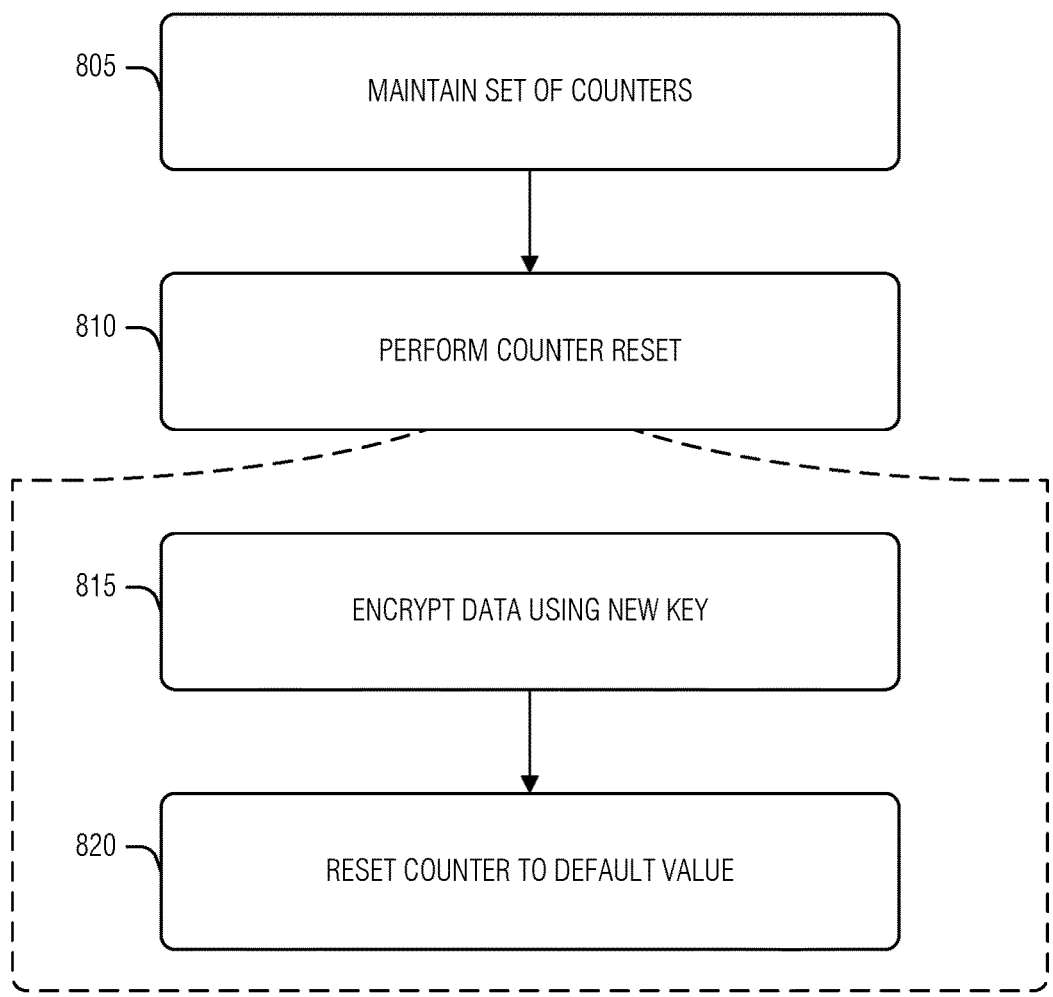
FIG. 8 illustrates a flow diagram of an example of a method for compressed integrity check counters in memory, according to an embodiment.

FIG. 8 illustrates a flow diagram of an example of a method 800 for compressed integrity check counters in memory, according to an embodiment. The operations of the method 800 are performed by hardware, such as that described above or below (e.g., processing circuitry).

At operation 805, a set of counters are maintained for data areas in memory. Here, a counter (e.g., a single counter) in the set of counters used to provide a variance to encryption operations on a data area (e.g., a single data area that corresponds to the single counter). The counter increments each time data is modified in the data area. In an example, the counter is used for an ICV that corresponds to the data area. In an example, the counter is stored in a cache line of the memory along with the ICV. In an example, data area is a portion of a cache line of the memory.

At operation 810, a counter reset is performed on the set of counters in response to a trigger. In an example, the trigger is a maintenance (e.g., garbage collection, de-fragmentation, etc.) operation. Each counter reset includes the operations 815 and 820.

At operation 815, the data area is encrypted using a new key. Here, the new key is different than previous keys used to refresh the data area. In an example, the new key was previously used on a different data area.

At operation 820, the counter is reset to a default value in response to encrypting the data area using the new key. In an example, the default value is zero.

In an example, the set of counters are a hierarchy of counters. Here, the counter mentioned above is at a lowest level of the hierarchy of counters (e.g., as are all counters that correspond to user data areas). All levels of the hierarchy higher than the lowest level correspond to counter data areas. The highest level of the hierarchy of counters is stored in a controller of the memory. In an example, the counter reset is performed in a progressive wave through the hierarchy of counters. In an example, the wave starts at the highest level of the hierarchy of counters and moves towards the lower levels.

In an example, the set of counters are implemented as a generalized multi-dimensional counter (GMDC). In an example, the GMDC has a structure divided by cache lines of the memory. Here, for a given cache line, the GMDC maintains local counters that correspond to data areas or to cache lines holding other counters. In an example, for a given cache line, the GMDC also includes a hierarchy of overflow counters. In an example, for a given cache line, the GMDC also includes a global counter. In an example, a local counter is combined with the global counter to produce variances for encryption operations.

Figure 9:
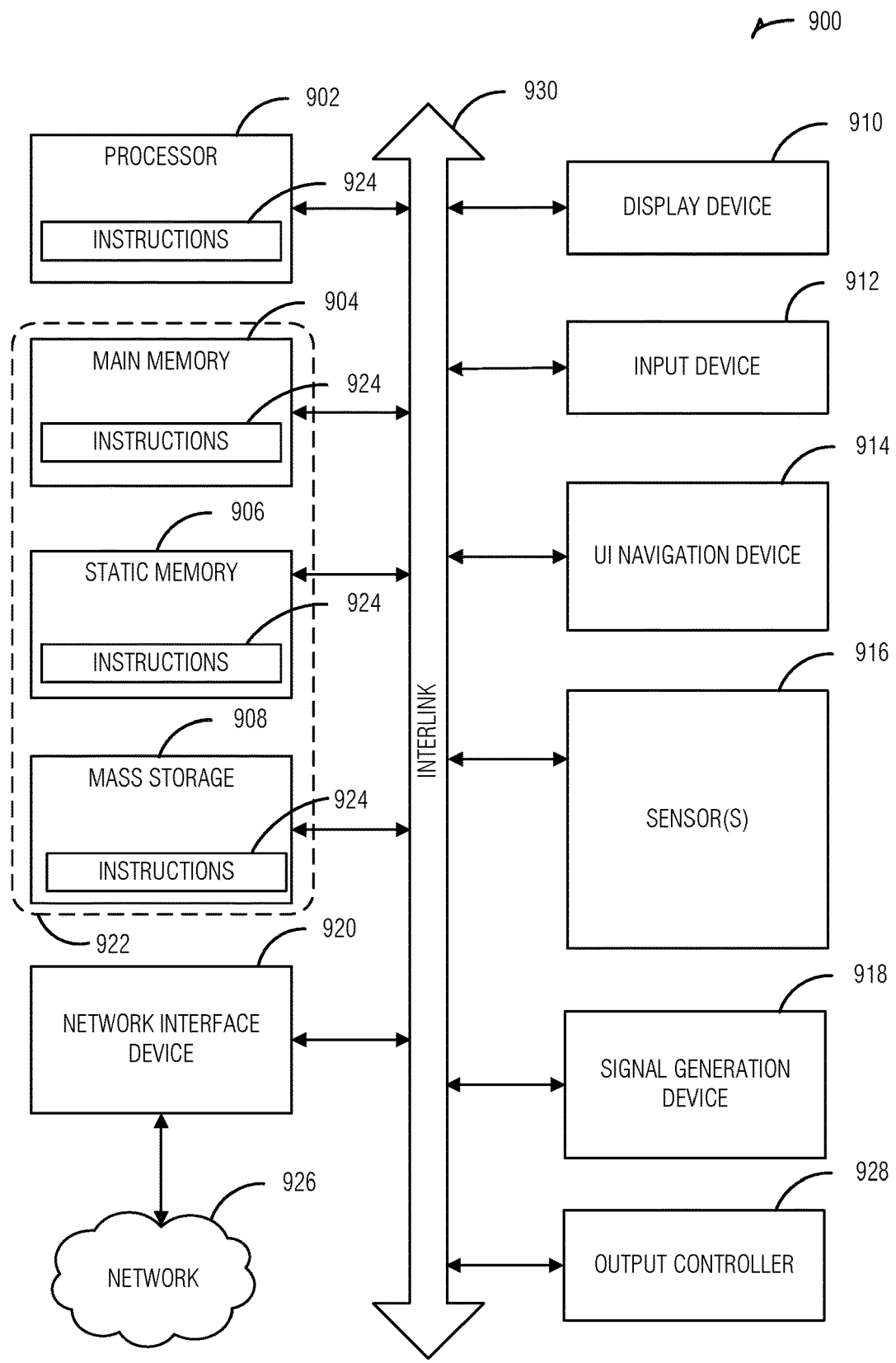
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is a memory controller for compressed integrity check counters in memory, the memory controller comprising: a machine readable medium including instructions; and processing circuitry that, when executing the instructions, operates to: maintain a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC); and perform a counter reset on the set of counters in response to a trigger, the counter reset including: a refresh of the corresponding data area using a new key, the new key being different than previous keys used to refresh the data area; and a reset of the respective counter to a default value in response to the refresh of the data area using the new key.

In Example 2, the subject matter of Example 1, wherein the GMDC is a size of a cache line, and the set of counters includes GMDCs for each cache line that holds the set of counters.

In Example 3, the subject matter of Example 2, wherein, the GMDC maintains local counters and an overflow counter, the value of the respective counter being a combination of one local counter and the overflow counter.

In Example 4, the subject matter of Example 3, wherein the combination of the one local counter and the overflow counter includes concatenation of the one local counter to the overflow counter.

In Example 5, the subject matter of any of Examples 3-4, wherein the combination of the one local counter and the overflow counter includes addition of the one local counter to the overflow counter.

In Example 6, the subject matter of any of Examples 3-5, wherein the one local counter includes a flag and a value, the flag is either ACTIVE or PASSIVE, and wherein the combination of the one local counter and the overflow counter includes addition of the overflow counter to the value if the flag is ACTIVE, and a result of the following computation otherwise:

$$\left(\left[\frac{GC}{T_{ACTIVE}}\right] - PV\right) \times T_{ACTIVE}$$

where GC is the overflow counter, PV is the value, and $T_{ACTIVE}$ is a constant value.

In Example 7, the subject matter of any of Examples 3-6, wherein, the overflow counter is a global counter.

In Example 8, the subject matter of any of Examples 3-7, wherein the overflow counter is one of several overflow counters in a hierarchy of overflow counters, the respective counter determined by combination of the one local counter with overflow counters in the hierarchy.

In Example 9, the subject matter of any of Examples 1-8, wherein the counter reset is performed in a progressive wave through the hierarchy of counters.

In Example 10, the subject matter of Example 9, wherein the wave starts at the highest level of the hierarchy of counters, and moves towards the lower levels.

In Example 11, the subject matter of any of Examples 1-10, wherein the set of counters are a hierarchy of counters, wherein the counter is at a lowest level of the hierarchy of counters, and wherein a highest level of the hierarchy of counters is stored in a controller of the memory.

In Example 12, the subject matter of any of Examples 1-11, wherein the respective counter is used for an integrity check value (ICV) that corresponds to the corresponding data area.

In Example 13, the subject matter of Example 12, wherein the respective counter is stored in a cache line of the memory along with the ICV.

In Example 14, the subject matter of any of Examples 1-13, wherein the data area is a cache line of the memory.

Example 15 is a method for compressed integrity check counters in memory, the method comprising: maintaining a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC); and performing a counter reset on the set of counters in response to a trigger, the counter reset including: refreshing the corresponding data area using a new key, the new key being different than previous keys used to refresh the data area; and resetting the respective counter to a default value in response to refreshing the data area using the new key.

In Example 16, the subject matter of Example 15, wherein the GMDC is a size of a cache line, and the set of counters includes GMDCs for each cache line that holds the set of counters.

In Example 17, the subject matter of Example 16, wherein, the GMDC maintains local counters and an overflow counter, the value of the respective counter being a combination of one local counter and the overflow counter.

In Example 18, the subject matter of Example 17, wherein the combination of the one local counter and the overflow counter includes concatenating the one local counter to the overflow counter.

In Example 19, the subject matter of any of Examples 17-18, wherein the combination of the one local counter and the overflow counter includes adding the one local counter to the overflow counter.

In Example 20, the subject matter of any of Examples 17-19, wherein the one local counter includes a flag and a value, the flag is either ACTIVE or PASSIVE, and wherein the combination of the one local counter and the overflow counter includes: adding the overflow counter to the value if the flag is ACTIVE, and computing the following otherwise:

$$\left(\left[\frac{GC}{T_{ACTIVE}}\right] - PV\right) \times T_{ACTIVE}$$

where GC is the overflow counter, PV is the value, and $T_{ACTIVE}$ is a constant value.

In Example 21, the subject matter of any of Examples 17-20, wherein the overflow counter is a global counter.

In Example 22, the subject matter of any of Examples 17-21, wherein the overflow counter is one of several overflow counters in a hierarchy of overflow counters, the respective counter determined by combining one local counter with overflow counters in the hierarchy.

In Example 23, the subject matter of any of Examples 15-22, wherein the counter reset is performed in a progressive wave through the hierarchy of counters.

In Example 24, the subject matter of Example 23, wherein the wave starts at the highest level of the hierarchy of counters, and moves towards the lower levels.

In Example 25, the subject matter of any of Examples 15-24, wherein the set of counters are a hierarchy of counters, wherein the counter is at a lowest level of the hierarchy of counters, and wherein a highest level of the hierarchy of counters is stored in a controller of the memory.

In Example 26, the subject matter of any of Examples 15-25, wherein the respective counter is used for an integrity check value (ICV) that corresponds to the corresponding data area.

In Example 27, the subject matter of Example 26, wherein the respective counter is stored in a cache line of the memory along with the ICV.

In Example 28, the subject matter of any of Examples 15-27, wherein the data area is a cache line of the memory.

Example 29 is at least one machine readable medium including instructions for compressed integrity check counters in memory, the instructions, when executed by a machine, cause the machine to perform operations comprising: maintaining a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC); and performing a counter reset on the set of counters in response to a trigger, the counter reset including: refreshing the corresponding data area using a new key, the new key being different than previous keys used to refresh the data area; and resetting the respective counter to a default value in response to refreshing the data area using the new key.

In Example 30, the subject matter of Example 29, wherein the GMDC is a size of a cache line, and the set of counters includes GMDCs for each cache line that holds the set of counters.

In Example 31, the subject matter of Example 30, wherein, the GMDC maintains local counters and an overflow counter, the value of the respective counter being a combination of one local counter and the overflow counter.

In Example 32, the subject matter of Example 31, wherein the combination of the one local counter and the overflow counter includes concatenating the one local counter to the overflow counter.

In Example 33, the subject matter of any of Examples 31-32, wherein the combination of the one local counter and the overflow counter includes adding the one local counter to the overflow counter.

In Example 34, the subject matter of any of Examples 31-33, wherein the one local counter includes a flag and a value, the flag is either ACTIVE or PASSIVE, and wherein the combination of the one local counter and the overflow counter includes: adding the overflow counter to the value if the flag is ACTIVE, and computing the following otherwise:

$$\left(\left[\frac{GC}{T_{ACTIVE}}\right] - PV\right) \times T_{ACTIVE}$$

where GC is the overflow counter, PV is the value, and $T_{ACTIVE}$ is a constant value.

In Example 35, the subject matter of any of Examples 31-34, wherein, the overflow counter is a global counter.

In Example 36, the subject matter of any of Examples 31-35, wherein the overflow counter is one of several overflow counters in a hierarchy of overflow counters, the respective counter determined by combining one local counter with overflow counters in the hierarchy.

In Example 37, the subject matter of any of Examples 29-36, wherein the counter reset is performed in a progressive wave through the hierarchy of counters.

In Example 38, the subject matter of Example 37, wherein the wave starts at the highest level of the hierarchy of counters, and moves towards the lower levels.

In Example 39, the subject matter of any of Examples 29-38, wherein the set of counters are a hierarchy of counters, wherein the counter is at a lowest level of the hierarchy of counters, and wherein a highest level of the hierarchy of counters is stored in a controller of the memory.

In Example 40, the subject matter of any of Examples 29-39, wherein the respective counter is used for an integrity check value (ICV) that corresponds to the corresponding data area.

In Example 41, the subject matter of Example 40, wherein the respective counter is stored in a cache line of the memory along with the ICV.

In Example 42, the subject matter of any of Examples 29-41, wherein the data area is a cache line of the memory.

Example 43 is a system for compressed integrity check counters in memory, the system comprising: means for maintaining a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC); and means for performing a counter reset on the set of counters in response to a trigger, the counter reset including: means for refreshing the corresponding data area using a new key, the new key being different than previous keys used to refresh the data area; and means for resetting the respective counter to a default value in response to refreshing the data area using the new key.

In Example 44, the subject matter of Example 43, wherein the GMDC is a size of a cache line, and the set of counters includes GMDCs for each cache line that holds the set of counters.

In Example 45, the subject matter of Example 44, wherein, the GMDC maintains local counters and an overflow counter, the value of the respective counter being a combination of one local counter and the overflow counter.

In Example 46, the subject matter of Example 45, wherein the combination of the one local counter and the overflow counter includes concatenating the one local counter to the overflow counter.

In Example 47, the subject matter of any of Examples 45-46, wherein the combination of the one local counter and the overflow counter includes adding the one local counter to the overflow counter.

In Example 48, the subject matter of any of Examples 45-47, wherein the one local counter includes a flag and a value, the flag is either ACTIVE or PASSIVE, and wherein the combination of the one local counter and the overflow counter includes: adding the overflow counter to the value if the flag is ACTIVE, and computing the following otherwise:

$$\left(\left[\frac{GC}{T_{ACTIVE}}\right] - PV\right) \times T_{ACTIVE}$$

where GC is the overflow counter, PV is the value, and $T_{ACTIVE}$ is a constant value.

In Example 49, the subject matter of any of Examples 45-48, wherein, the overflow counter is a global counter.

In Example 50, the subject matter of any of Examples 45-49, wherein the overflow counter is one of several overflow counters in a hierarchy of overflow counters, the respective counter determined by combining one local counter with overflow counters in the hierarchy.

In Example 51, the subject matter of any of Examples 43-50, wherein the counter reset is performed in a progressive wave through the hierarchy of counters.

In Example 52, the subject matter of Example 51, wherein the wave starts at the highest level of the hierarchy of counters, and moves towards the lower levels.

In Example 53, the subject matter of any of Examples 43-52, wherein the set of counters are a hierarchy of counters, wherein the counter is at a lowest level of the hierarchy of counters, and wherein a highest level of the hierarchy of counters is stored in a controller of the memory.

In Example 54, the subject matter of any of Examples 43-53, wherein the respective counter is used for an integrity check value (ICV) that corresponds to the corresponding data area.

In Example 55, the subject matter of Example 54, wherein the respective counter is stored in a cache line of the memory along with the ICV.

In Example 56, the subject matter of any of Examples 43-55, wherein the data area is a cache line of the memory.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A memory controller for compressed integrity check counters in memory, the memory controller comprising:
a machine readable medium including instructions; and
processing circuitry that, when executing the instructions, operates to:
maintain a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC), wherein the GMDC is a size of a cache line, and the set of counters includes GMDCs for each cache line that holds the set of counters, and wherein the GMDC maintains local counters and an overflow counter, the value of the respective counter being a combination of one local counter and the overflow counter; and
perform a counter reset on the set of counters in response to a trigger, the counter reset including:
a refresh of the corresponding data area using a new key, the new key being different than previous keys used to refresh the data area; and
a reset of the respective counter to a default value in response to the refresh of the data area using the new key.

2. The memory controller of claim 1, wherein the counter reset is performed in a progressive wave through the hierarchy of counters.

3. The memory controller of claim 2, wherein the wave starts at the highest level of the hierarchy of counters, and moves towards the lower levels.

4. The memory controller of claim 1, wherein the combination of the one local counter and the overflow counter includes concatenation of the one local counter to the overflow counter.

5. The memory controller of claim 1, wherein the combination of the one local counter and the overflow counter includes addition of the one local counter to the overflow counter.

6. The memory controller of claim 1, wherein the one local counter includes a flag and a value, the flag is either ACTIVE or PASSIVE, and wherein the combination of the one local counter and the overflow counter includes addition of the overflow counter to the value if the flag is ACTIVE, and a result of the following computation otherwise:

$$\left(\left[\frac{GC}{T_{ACTIVE}}\right] - PV\right) \times T_{ACTIVE}$$

where GC is the overflow counter, PV is the value, and $T_{ACTIVE}$ is a constant value.

7. The memory controller of claim 1, wherein, the overflow counter is a global counter.

8. The memory controller of claim 1, wherein the overflow counter is one of several overflow counters in a hierarchy of overflow counters, the respective counter determined by combination of the one local counter with overflow counters in the hierarchy.

9. A method for compressed integrity check counters in memory, the method comprising:
maintaining a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC), wherein the GMDC is a size of a cache line, and the set of counters includes GMDCs for each cache line that holds the set of counters, and wherein the GMDC maintains local counters and an overflow counter, the value of the respective counter being a combination of one local counter and the overflow counter; and
performing a counter reset on the set of counters in response to a trigger, the counter reset including:
refreshing the corresponding data area using a new key, the new key being different than previous keys used to refresh the data area; and
resetting the respective counter to a default value in response to refreshing the data area using the new key.

10. The method of claim 9, wherein the counter reset is performed in a progressive wave through the hierarchy of counters.

11. The method of claim 10, wherein the wave starts at the highest level of the hierarchy of counters, and moves towards the lower levels.

12. The method of claim 9, wherein the combination of the one local counter and the overflow counter includes concatenating the one local counter to the overflow counter.

13. The method of claim 9, wherein the combination of the one local counter and the overflow counter includes adding the one local counter to the overflow counter.

14. The method of claim 9, wherein the one local counter includes a flag and a value, the flag is either ACTIVE or PASSIVE, and wherein the combination of the one local counter and the overflow counter includes: adding the overflow counter to the value if the flag is ACTIVE, and computing the following otherwise:

$$\left(\left[\frac{GC}{T_{ACTIVE}}\right] - PV\right) \times T_{ACTIVE}$$

where GC is the overflow counter, PV is the value, and $T_{ACTIVE}$ is a constant value.

15. The method of claim 9, wherein, the overflow counter is a global counter.

16. The method of claim 9, wherein the overflow counter is one of several overflow counters in a hierarchy of overflow counters, the respective counter determined by combining one local counter with overflow counters in the hierarchy.

17. At least one non-transitory machine readable medium including instructions for compressed integrity check counters in memory, the instructions, when executed by a machine, cause the machine to perform operations comprising:
maintaining a set of counters for data areas in memory, a respective counter in the set of counters used to provide a variance to encryption operations on a corresponding data area, the respective counter incrementing each time data is modified in the corresponding data area, the respective counter implemented by a generalized multi-dimensional counter (GMDC), wherein the GMDC is a size of a cache line, and the set of counters includes GMDCs for each cache line that holds the set of counters, and wherein the GMDC maintains local counters and an overflow counter, the value of the respective counter being a combination of one local counter and the overflow counter; and
performing a counter reset on the set of counters in response to a trigger, the counter reset including:
refreshing the corresponding data area using a new key, the new key being different than previous keys used to refresh the data area; and
resetting the respective counter to a default value in response to refreshing the data area using the new key.

18. The at least one machine readable medium of claim 17, wherein the counter reset is performed in a progressive wave through the hierarchy of counters.

19. The at least one machine readable medium of claim 18, wherein the wave starts at the highest level of the hierarchy of counters, and moves towards the lower levels.

20. The at least one machine readable medium of claim 17, wherein the combination of the one local counter and the overflow counter includes concatenating the one local counter to the overflow counter.

21. The at least one machine readable medium of claim 17, wherein the combination of the one local counter and the overflow counter includes adding the one local counter to the overflow counter.

22. The at least one machine readable medium of claim 17, wherein the one local counter includes a flag and a value, the flag is either ACTIVE or PASSIVE, and wherein the combination of the one local counter and the overflow counter includes:
adding the overflow counter to the value if the flag is ACTIVE, and computing the following otherwise:

$$\left(\left[\frac{GC}{T_{ACTIVE}}\right]-PV\right)\times T_{ACTIVE}$$

where GC is the overflow counter, PV is the value, and $T_{ACTIVE}$ is a constant value.

23. The at least one machine readable medium of claim 17, wherein, the overflow counter is a global counter.

24. The at least one machine readable medium of claim 17, wherein the overflow counter is one of several overflow counters in a hierarchy of overflow counters, the respective counter determined by combining one local counter with overflow counters in the hierarchy.

* * * * *